(12) United States Patent
McCardle et al.

(10) Patent No.: US 12,442,602 B2
(45) Date of Patent: Oct. 14, 2025

(54) AUTOMOTIVE LOCKING RING AND INTERCOOLER WITH CARBONFIBER END TANK

(71) Applicant: Resource Intl Inc., New Castle, DE (US)

(72) Inventors: Kevin McCardle, Philadelphia, PA (US); Dan Tafe, Newark, DE (US)

(73) Assignee: Resource Intl Inc., New Castle, DE (US)

( * ) Notice: Subject to any disclaimer, the term of this patent is extended or adjusted under 35 U.S.C. 154(b) by 147 days.

(21) Appl. No.: 18/085,285

(22) Filed: Dec. 20, 2022

(65) Prior Publication Data

US 2023/0194192 A1      Jun. 22, 2023

Related U.S. Application Data

(60) Provisional application No. 63/292,204, filed on Dec. 21, 2021.

(51) Int. Cl.
| | |
|---|---|
| *F28F 9/02* | (2006.01) |
| *F02B 29/04* | (2006.01) |
| *F28F 21/02* | (2006.01) |
| *F28F 21/08* | (2006.01) |

(52) U.S. Cl.
CPC ........ *F28F 9/0226* (2013.01); *F02B 29/0456* (2013.01); *F28F 21/02* (2013.01); *F28F 21/084* (2013.01); *F28F 2265/26* (2013.01)

(58) Field of Classification Search
CPC ........ F28F 9/0226; F28F 21/02; F28F 21/084; F28F 2265/26; F02B 29/0456
USPC .......................................................... 165/175
See application file for complete search history.

(56) References Cited

U.S. PATENT DOCUMENTS

| | | |
|---|---|---|
| 7,255,160 B2 | 8/2007 | Wada et al. |
| 9,890,692 B1 | 2/2018 | Turnage |
| 2015/0068715 A1 | 3/2015 | Raver |
| 2019/0128221 A1 | 5/2019 | Tiramani et al. |

FOREIGN PATENT DOCUMENTS

| | | |
|---|---|---|
| CN | 215057725 U | 12/2021 |
| JP | 2004533369 A | * 11/2004 |

* cited by examiner

*Primary Examiner* — Davis D Hwu
(74) *Attorney, Agent, or Firm* — Condo Roccia Koptiw LLP

(57) ABSTRACT

Systems, devices, and methods are disclosed for attaching two automotive components comprising different materials having different coefficients of expansion, comprising providing a flange around a perimeter of each of the components, wherein at least one component defines a plenum contiguous to the perimeter, providing corresponding inner faces of the flanges, providing a channel in at least one of the corresponding faces of the flanges, wherein the channel is coaxial to the perimeter, disposing a gasket in the channel, and surrounding the flanges with a locking ring, wherein the ring has an axial channel and a pin disposed perpendicular to the channel to secure a first end of the locking ring to a mating second end of the locking ring.

20 Claims, 9 Drawing Sheets

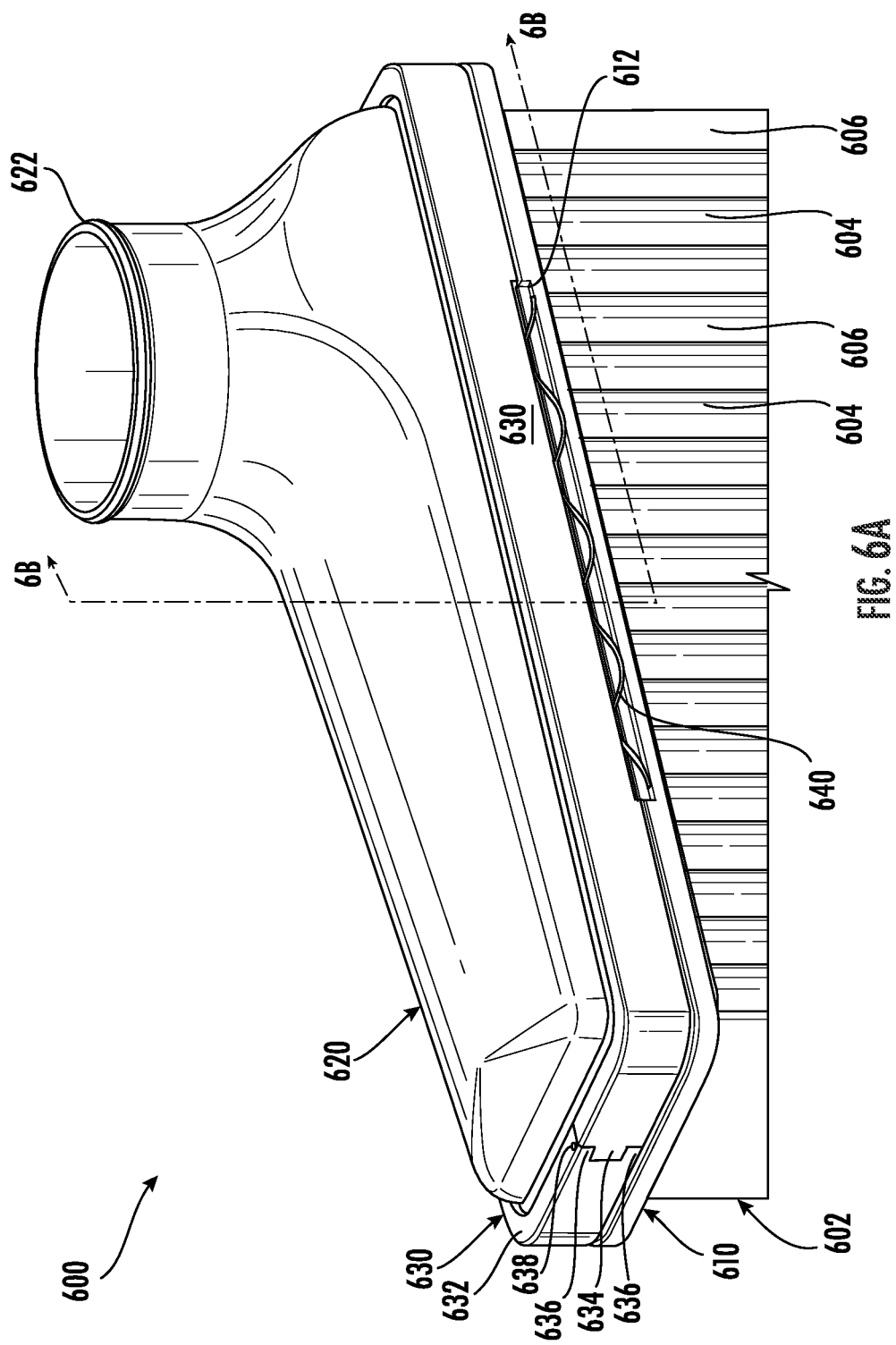

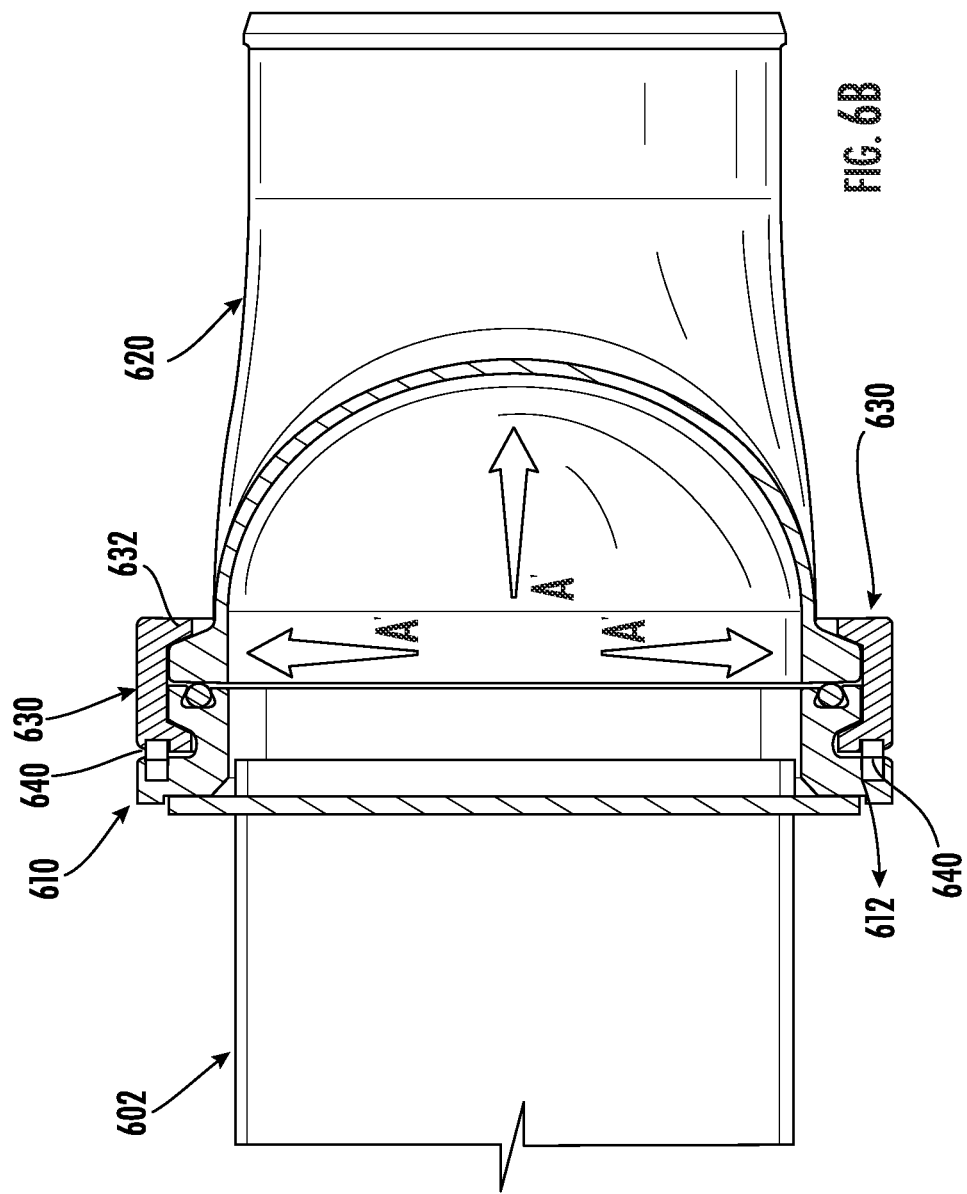

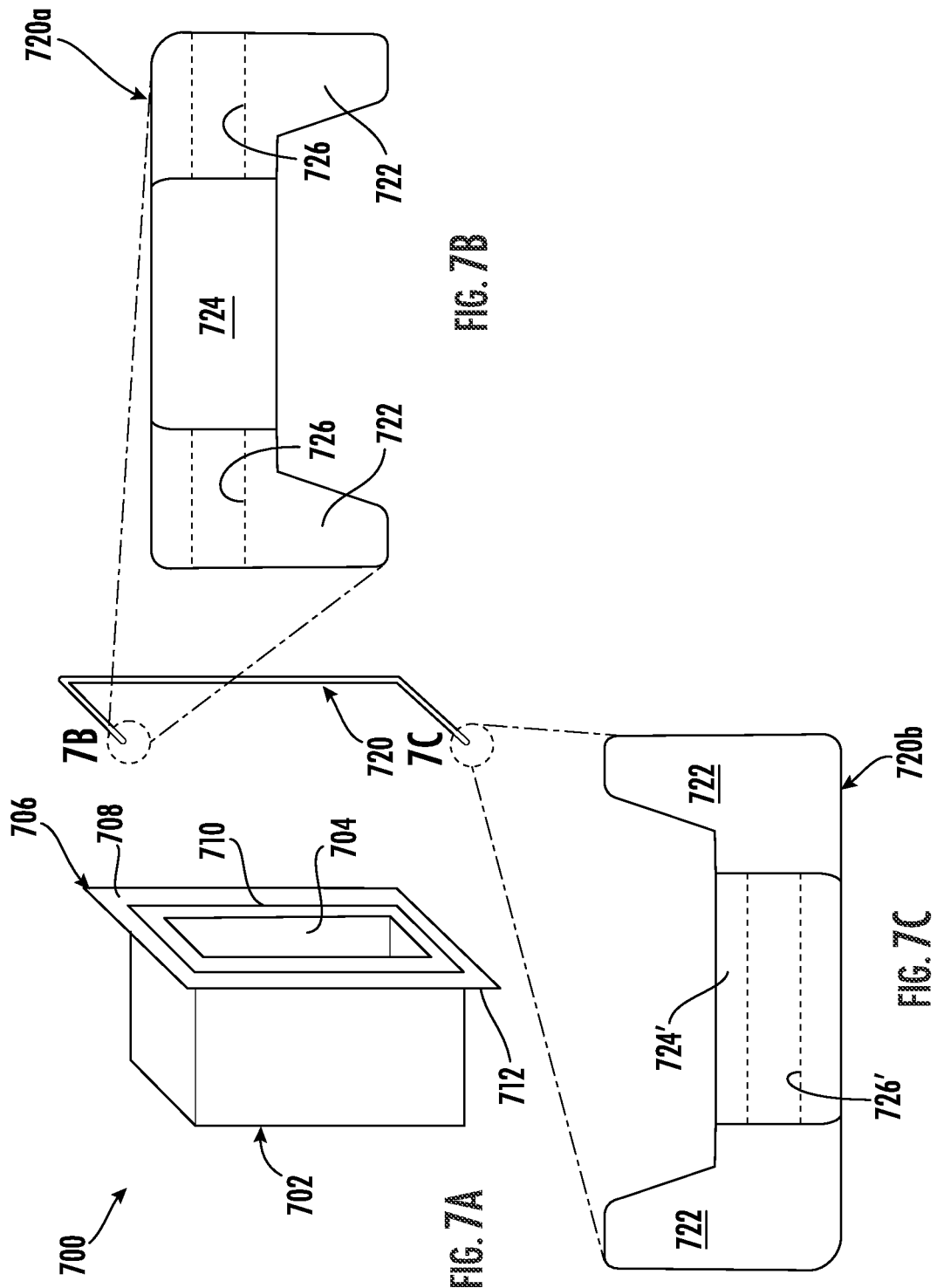

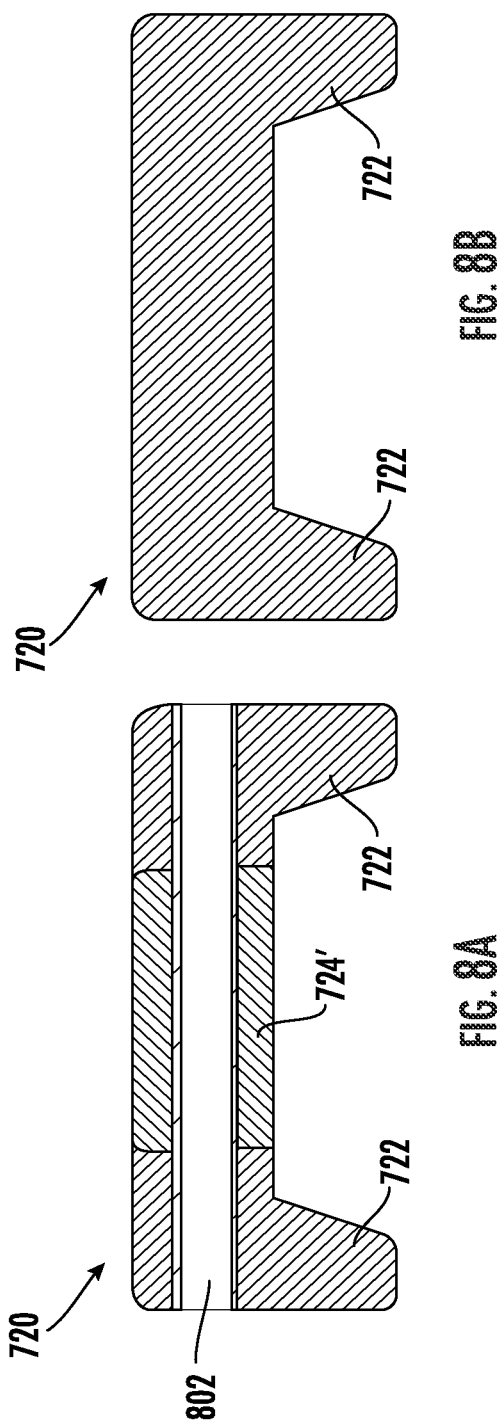

AUTOMOTIVE LOCKING RING AND INTERCOOLER WITH CARBONFIBER END TANK

CROSS REFERENCE TO RELATED APPLICATION

This application claims the benefit of U.S. Provisional Application Ser. No. 63/292,204, filed Dec. 21, 2021, the entire contents of which are incorporated by reference herein.

BACKGROUND

Internal combustion engine performance (e.g., in a vehicle) can be improved by providing compressed air (for example, via a turbocharger or a supercharger) to the engine. However, the compressed air leaving the turbocharger (or supercharger) is very hot and is beneficially cooled before entering the engine (e.g., to further improve combustion). Advantageously, an intercooler may be interposed between the turbocharger (or supercharger) and the engine.

Intercoolers typically define a flow path starting from a hot side inlet for intaking the compressed air, which enters into an end tank. The end tank acts as a plenum for a plurality of tubes which are spaced apart by fins, the combination functioning as a heat sink (referred to as the core). A crossflow of ambient air, such as from vehicle movement, flows between the tubes (e.g., around the outside of the tubes). The now-cooled compressed air exits the tubes into another end tank and out the end tank's cold side outlet to the vehicle engine.

Conventionally, some end tanks and core are made of aluminum. It may be beneficial to have the end tanks be of a material other than aluminum, however, methods and devices for affixing end tanks of a first material to a core of a second material (e.g., aluminum) are needed. Differences in thermal expansion, the need to maintain pressure within the system, and space constraints within a vehicle engine compartment all add to the complexity of developing this type of arrangement. For example, merely boring holes in each of the end tank and the core and bolting them together is undesirable, as the holes can cause stress concentrations in the metal particularly, which weakens the components and predisposes them to failure. Moreover, in a pressurized system, such an arrangement is particularly unsuitable for attaching two materials having different coefficients of expansion.

SUMMARY

Systems, devices, and methods are disclosed for attaching two automotive components comprising different materials having different coefficients of expansion, comprising providing a flange around a perimeter of each of the components, wherein at least one component defines a plenum contiguous to the perimeter, providing corresponding inner faces of the flanges, providing a channel in at least one of the corresponding faces of the flanges, wherein the channel is coaxial to the perimeter, disposing a gasket in the channel, and surrounding the flanges with a locking ring, wherein the ring has an axial channel and a pin disposed perpendicular to the channel to secure a first end of the locking ring to a mating second end of the locking ring.

Systems, devices, and methods are also disclosed for an intercooler comprising an aluminum core, at least one carbon fiber end tank, and a locking ring for attaching the carbon fiber end tank to the core. In some embodiments, an inner channel of the locking ring engages an outer surface of a core flange and an outer flange of the at least one end tank. In some embodiments, a first end and a second end of the locking ring are secured together by a transverse pin to form a continuous ring. In some embodiments, the locking ring is a pair of identical portions inversely connected. In some embodiments, the inner cooler further comprises a linear wave spring for securing the locking ring.

BRIEF DESCRIPTION OF THE DRAWINGS

FIG. 6A depicts an intercooler according to another embodiment of the present disclosure with a cutaway to show a recess;

FIG. 6B depicts a detail sectional view of a portion of FIG. 6B represented by bracket 6B in FIG. 6A;

FIG. 7A depicts an automotive component and a portion of a locking ring according to another embodiment of the present disclosure;

FIG. 7B depicts a detail view of a portion of FIG. 7A represented by circle 7B;

FIG. 7C depicts a detail view of a portion of FIG. 7A represented by circle 7C;

FIG. 8A depicts a sectional view of a locking ring connection; and

FIG. 8B depicts a sectional view of a locking ring (not at a connection).

DETAILED DESCRIPTION

Figure 1:
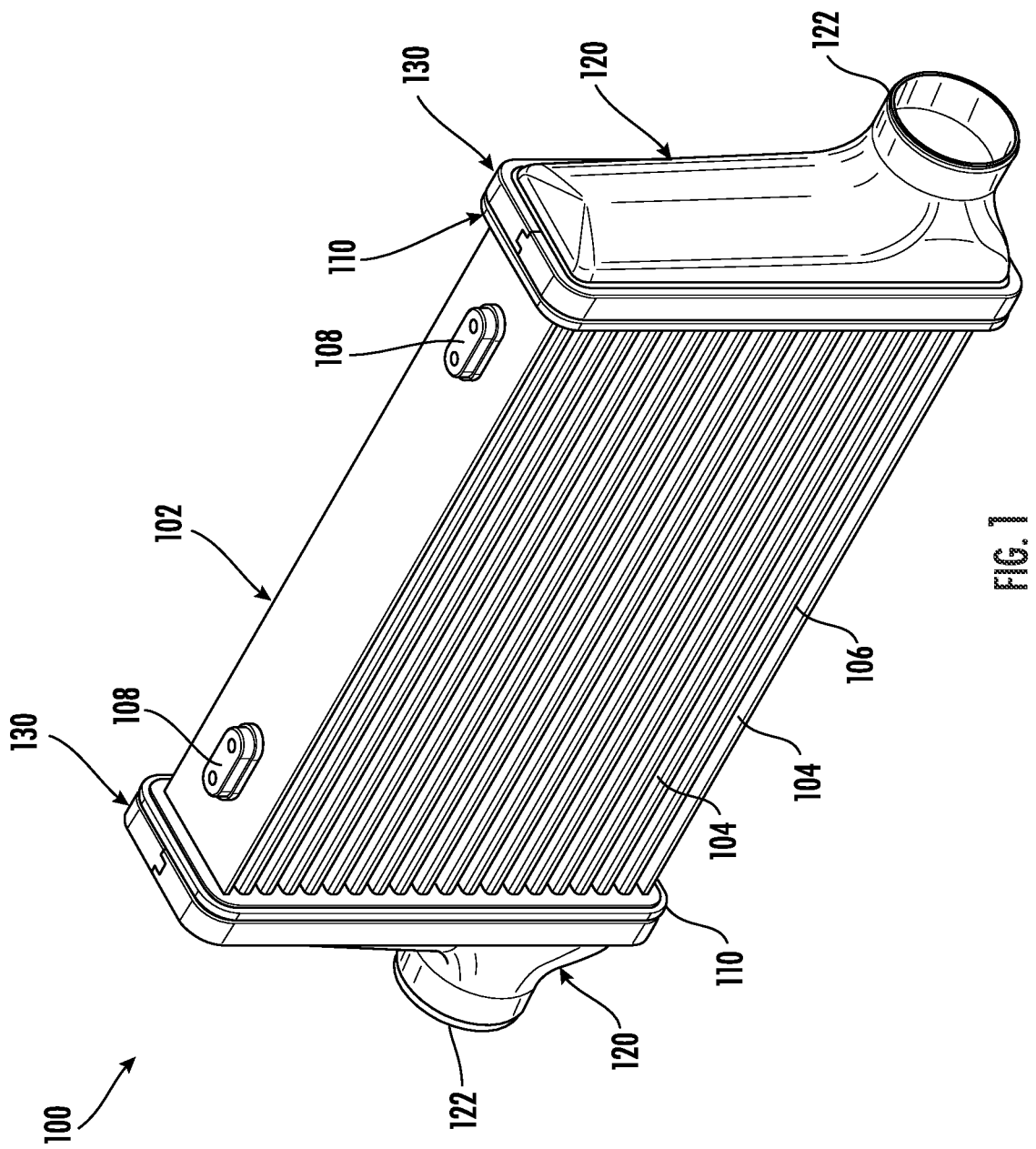
FIG. 1 depicts an intercooler according to the present disclosure.

FIG. 1 depicts an intercooler 100 according to the present disclosure. As depicted, the intercooler is an air to air intercooler, but other intercoolers, and indeed, other automotive components, are contemplated, as will be appreciated from the following disclosure. The intercooler 100 may be disposed in an engine compartment (or bay) of an internal combustion engine-powered vehicle (not depicted). The intercooler 100 receives hot compressed air leaving a turbocharger (or supercharger) and cools the compressed air before the compressed air reaches the engine.

A core 102 of the intercooler 100 comprises a plurality of tubes 104 for carrying a fluid (e.g., the compressed air) from a first end of a tube through the tube and out a second end of the tube, allowing heat exchange, as will be described. The tubes 104 are spaced apart to define spaces 106 therebetween. A crossflow (e.g., with reference to an orientation of the tubes 104) of ambient air, such as from vehicle movement, flows through the spaces 106, transverse to the tubes. Preferably, fins (not visible) are disposed in the spaces 106 to facilitate heat transfer. Mounting brackets 108 are disposed on the core 102 for securing the intercooler 100 to the vehicle. Preferably, the core 102 is made of aluminum.

The core 102 further comprises a pair of core flanges 110 disposed at distal ends of the core. The core flanges 110, as will be discussed, sealingly contact portions of respective end tanks 120. The core flanges 110 may be attached to the core (e.g., such as by welding) or may be formed as part of the core. Preferably, the core flanges 110 are formed from aluminum, and in any case, the core flanges have a first coefficient of expansion (e.g., with respect to heat).

A pair of carbon fiber end tanks 120 are disposed on either side of the core 102. The carbon fiber end tanks 120 define a plenum (not visible) in fluid communication with the tubes 104 of the core 102. Additional features are contemplated, for example, a strut may be disposed in the plenum. In some embodiments, flow directors (or, alternatively, baffles) may be disposed in the plenum. Each of the carbon fiber end tanks 120 has a port 122, which acts as an inlet or outlet depending on flow direction (e.g., see FIG. 2). End tanks with more than one port are contemplated within the spirit of the disclosure. For example, multi-ported embodiments are contemplated, such as two inlets and one outlet, one inlet and two outlets, and as may be understood, they also may be symmetrical or asymmetrical as to shape or inlet/outlet position. Accordingly, a pair of carbon fiber end tanks contemplated by the disclosure may be symmetrical or asymmetrical. In yet another embodiment, the inlet and outlet may be on a first end tank, and the second end tank may be a U-shaped return.

Comprising carbon fiber, the carbon fiber end tanks 120 have a second coefficient of expansion (e.g., with respect to heat). As will be appreciated, connection of the carbon fiber end tanks 120 to the core 102 would be difficult, for example, they cannot be welded together, and an adhesive would have to be capable of bonding disparate materials, and lasting for years under a range of temperatures from about −20° F. to about 325° F., in some embodiments, from about −30° F. to about 325°, and a range of operating pressures from about 0 psi to 30 psi, in some embodiments, from about 0 psi to 40 psi, as well as to be resistant to fluids commonly used in automotive applications. As mentioned above, bolting the end tanks 120 to the core 102 and/or core flanges 110 would be detrimental to the intercooler 100 due to formation of stress concentrations in the core flanges (e.g., from holes for the bolts) and thermal expansion differences between the core and end tanks.

Accordingly, a locking ring 130 is provided to connect the carbon fiber end tanks 120 to the core 102, for example, by engaging the interposed core flanges 110. In some embodiments, the locking ring 130 overlaps a portion of the flanges. In some embodiments, the locking ring 130 overlaps the entire perimeter of the flanges. The locking ring 130 may be aluminum or other suitable material. Once locked together, the locking ring 130 forms a continuous ring around corresponding flanges of the core flange 110 and carbon fiber end tank 120. Advantageously, the locking ring 130 sealingly secures the core 102 and carbon fiber end tank 120 together, and is effective under a variety of operating temperatures and pressures, in spite of the materials having different coefficients of expansion.

Figure 2:
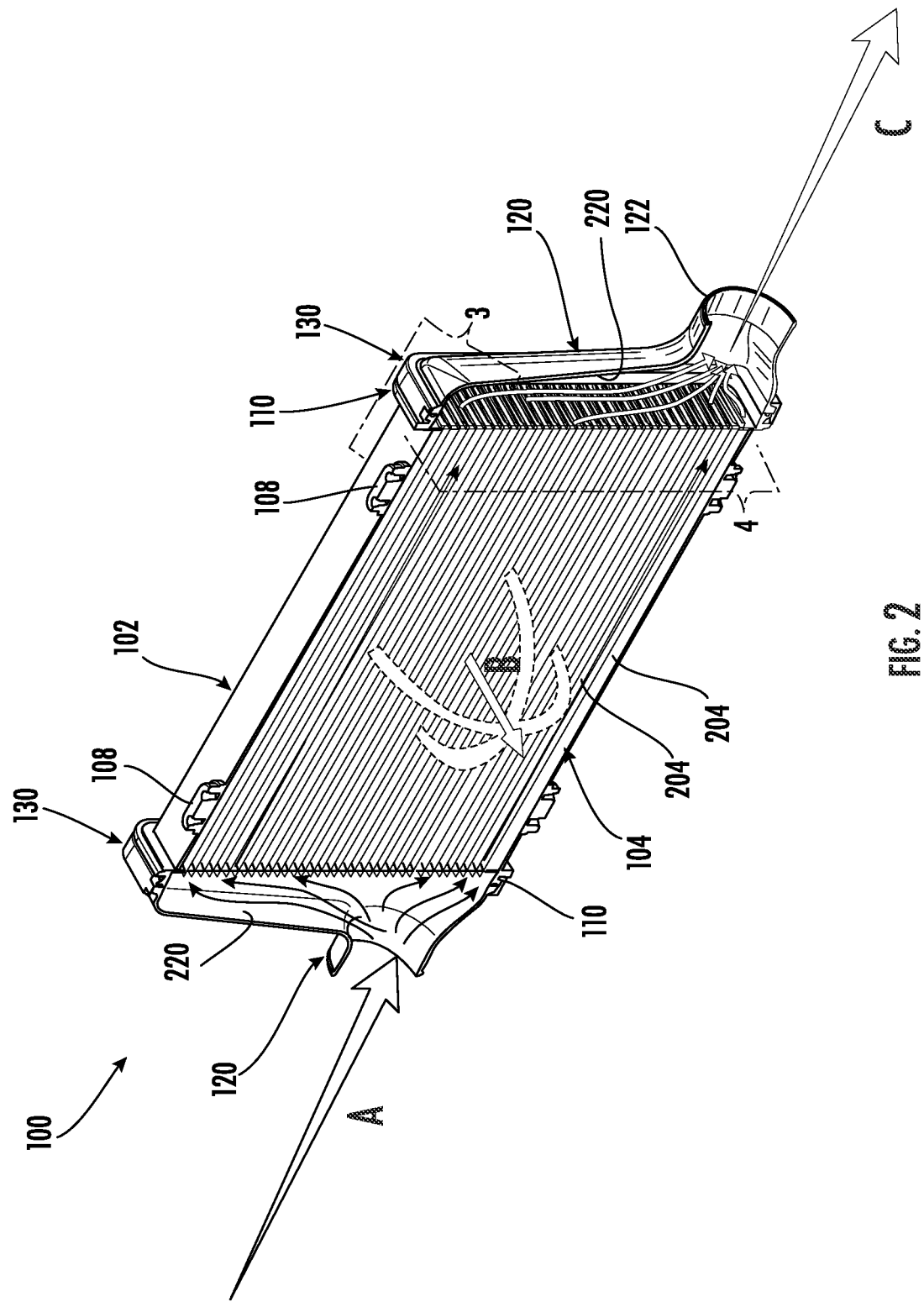
FIG. 2 depicts a sectional view of FIG. 1.

Turning to FIG. 2, which depicts a sectional view of FIG. 1, and uses the same reference numerals, hot compressed air (e.g., from a turbocharger (or a supercharger)) represented by arrow A, enters a plenum 220 defined by a first carbon fiber end tank 120 (left in FIGS. 1&2). The locking ring 130 sealingly secures the core 102 and carbon fiber end tank 120 together even though there is at least a partial heat gradient across a width of the locking ring (e.g., based on the different thermal transfer coefficients of the materials, which are heated by the compressed air leaving the turbocharger (or supercharger)). The hot air in the plenum 220 enters a plurality of ducts 204 defined by the plurality of tubes 104 and passes through the ducts toward a plenum 220 defined by a second carbon fiber end tank 120 (right in FIGS. 1&2).

A crossflow of ambient air, represented by arrow B, such as from vehicle movement, flows through the spaces 106 between the tubes 104 (e.g., around the outside of the tubes), cooling the compressed air in the ducts 204. The cooled compressed air exits the plurality of ducts 204 via ends 204a and enters the plenum 220. The cooled compressed air in the plenum 220 exits the carbon fiber end tank port 122 (e.g., the outlet in this configuration) represented by arrow C, toward the engine (not depicted).

Figure 3:
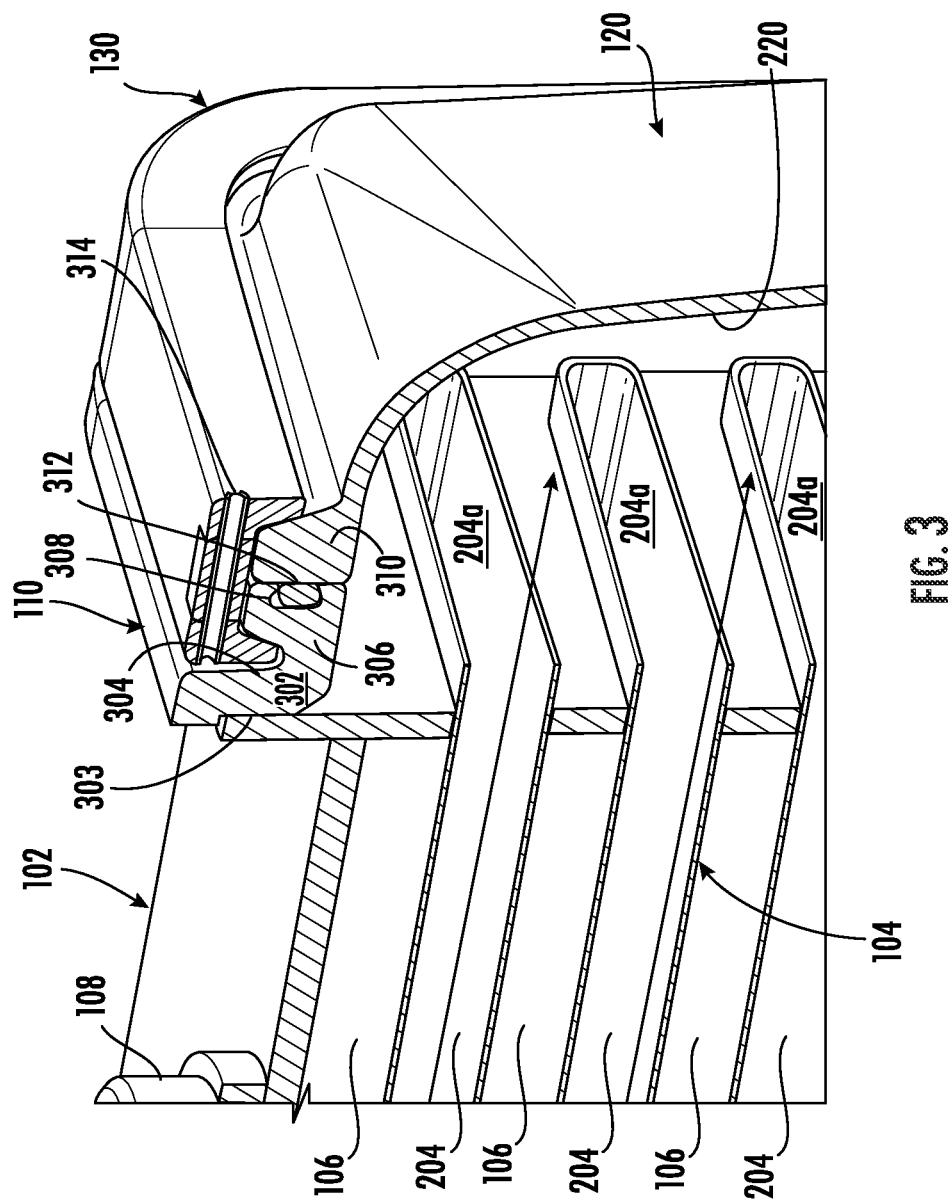
FIG. 3 depicts a detail view of a portion of FIG. 2 represented by bracket 3 in FIG. 2.

FIG. 3 depicts a detail view of a portion of FIG. 2 and uses the same reference numerals. The core flange 110, now in section, has a body 302. An attachment point or region 303 marks where the core flange 110 it is affixed (e.g., welded) to the core 102. The body 302 has a first channel 304 defined therein, the first channel receiving a portion of the locking ring 130. A flange portion 306 of the body 302 defines a perimeter of the core flange 110, with a face of the flange abutting the carbon fiber end tank 120.

The body 302 has a second channel 308, which is disposed in the flange portion 306. The second channel 308 is, in some embodiments, perpendicular to the first channel 304. The second channel 308 is generally coaxial to the perimeter of the core flange 110.

The carbon fiber end tank 120 has a flange 310 which defines a face that corresponds to (e.g., is configured to engage) the face of the flange portion 306 of the core flange 110. In some embodiments, the flange 310 is integral to the end tank 120, for example, formed as a feature of the end tank. The core flange and the carbon fiber end tank are sealingly engaged to preserve pressure in the plenum 220. In some embodiments, a gasket 312 (e.g., such as an O-ring) is disposed in the second channel 308 to further seal the plenum 220. In some embodiments, the second channel 308 is disposed on the face of the flange 310 of carbon fiber end tank 120 (e.g., instead of on the face of the flange portion 306 of the core flange 110). In some embodiments, instead of only one face having the channel 308, both faces have corresponding smaller channels (e.g., to cooperate to define the channel).

As will be described in greater detail, to form a continuous ring, the locking ring 130 must have a connection between a first end and a second end, e.g., because edges of the locking ring overlap the flanges of the core flange 110 and carbon fiber end tank 120. The section view in FIG. 3 is taken through an exemplary connection. While the first and second ends in some embodiments could be permanently affixed (e.g., welded), in preferred embodiments, the locking ring 130 may comprise a tongue and groove arrangement having aligned cross-bores, and a pin 314 may be disposed in the aligned cross-bores, transverse to the locking ring (e.g., to connect respective ends of the locking ring to form a continuous ring). In some embodiments, the pin 314 is a slotted spring pin.

Figure 4:
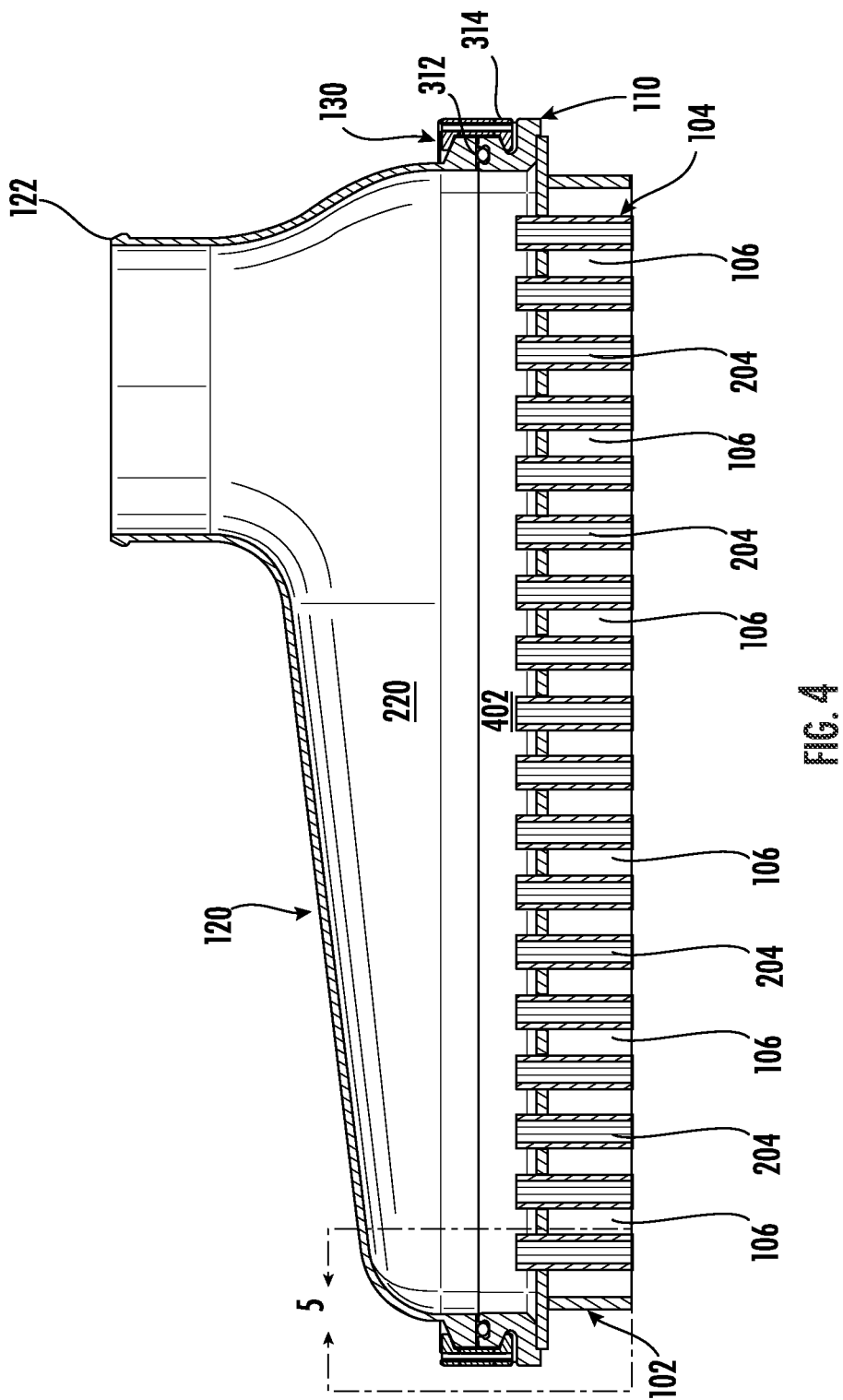
FIG. 4 depicts a portion of FIG. 2 from a different perspective, represented by bracket 4 in FIG. 2.

FIG. 4 depicts a portion of FIG. 2, albeit from a different perspective, and uses the same reference numerals. In some embodiments, the core flange 110 (e.g., now in cross-section) also defines a plenum 402. The plenum 402 is in fluid communication with the plenum 220.

Figure 5:
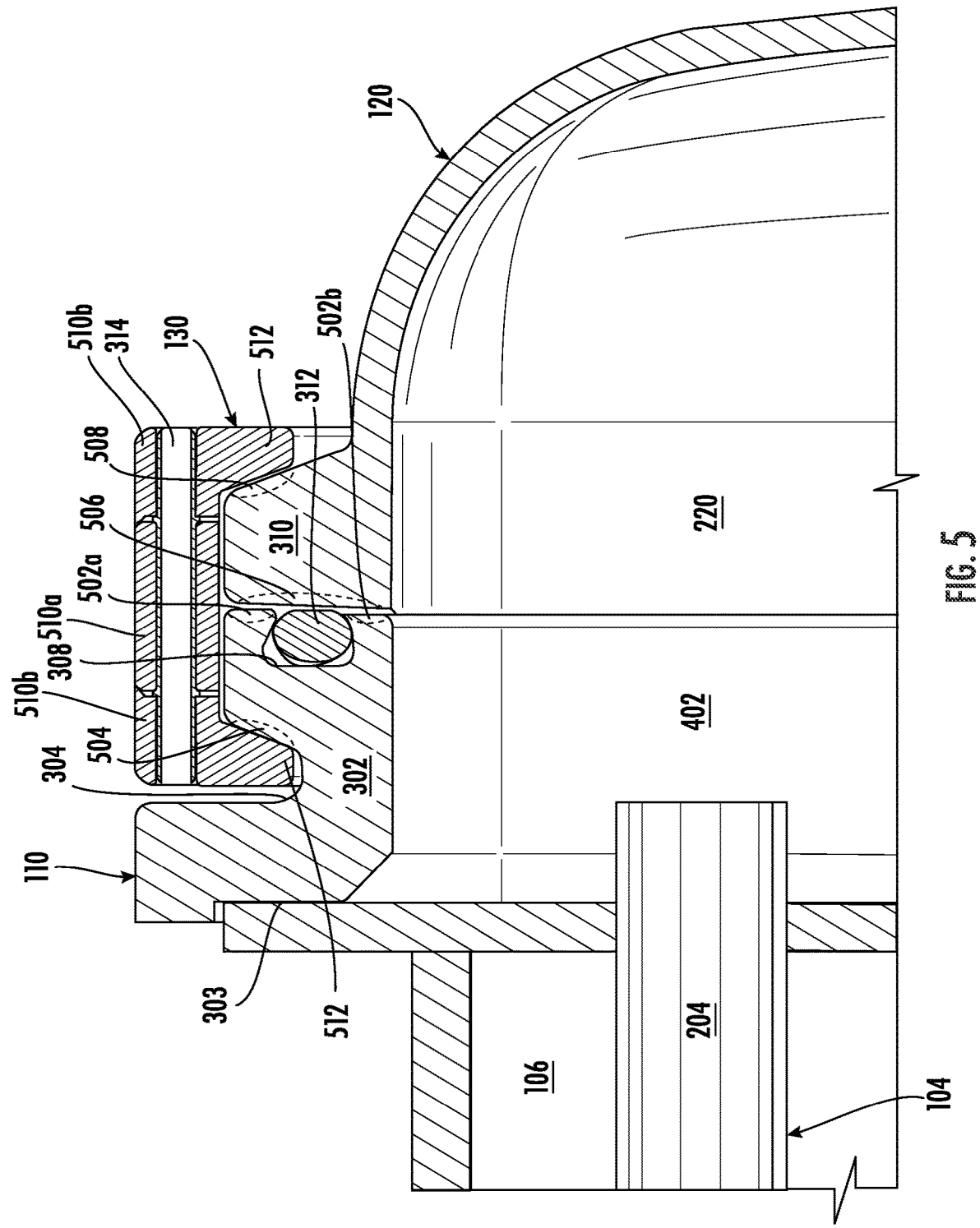
FIG. 5 depicts a detail view of a portion of FIG. 4 represented by bracket 5 in FIG. 4.

FIG. 5 depicts a detail view of a portion of FIG. 4 and uses the same reference numerals. The second channel 308 divides the face of the core flange 110 into a first face portion 502a and a second face portion 502b. For clarity of illustration, it is understood that some components that would in practice be abutting are depicted with small spaces therebetween. A portion 504 of the first channel 304 (e.g., an outer portion relative to the face (e.g., 502a, 502b) of the flange) engages an edge 512 of the locking ring 130.

The flange 310 of the carbon fiber end tank 120 has a face 506 which sealingly engages the gasket 312 and the first portion 502*a* and the second portion 502*b* of the core flange 110. A portion 508 of the flange 310 engages an edge 512 of the locking ring 130. As can be appreciated, a force is exerted by the edges 512 of the locking ring 130 on the core flange 110 (e.g., at portion 504) and the carbon fiber end tank 120 (e.g., at portion 508), biasing them together. The force may increase with increasing temperature as the materials expand. In other words, the locking ring 130 advantageously becomes more effective as one or more of the core body 302 or end tank flange 310 increases in temperature.

Further to the description in FIG. 3, the locking ring 130 may, e.g., at a first end of the locking ring, have a first axial tab 510*a*. The axial tab 510*a* is received between two axial protrusions 510*b* (e.g., disposed at a second end of the locking ring), the axial tab and two axial protrusions having aligned cross-bores (e.g., extending from edge 512 to edge).

With reference to the preceding figures, to assemble the intercooler 100, the core flange 110 may be welded to the core 102. Alternatively, the core flange 110 may be an integrally formed portion of the core 102. The carbon fiber end tank 120 may be molded or otherwise formed. The locking ring 130 may be milled, extruded, and/or pressed in a die. The locking ring 130 may have one connection as above. In a preferred embodiment, the locking ring 130 may have two connections. The core flange 110 may receive the gasket 312, and the core flange and the carbon fiber end tank 120 may be clamped together. A first connection of the locking ring 130 (e.g., a first portion of the locking ring connected to a substantially similar inverted portion of the locking ring) may be assembled (such as by inserting the pin 314 in aligned cross-bores) and the edges of the locking ring extended over the flanges of the core flange 110 and the carbon fiber end tank 120. Next, a second connection of the locking ring 130 may be completed (such as by inserting another pin 314 in a second set of aligned cross-bores at ends of the locking ring), and the locking ring made continuous.

FIGS. 6A and 6B depict an intercooler 600 according to another embodiment of the present disclosure. The intercooler 600 may operate (e.g., in a vehicle) similarly to the previously described intercooler 100. A core 602 of the intercooler 600 comprises a plurality of tubes 604 for carrying a fluid from a first end of a tube through the tube and out a second end of the tube, allowing heat exchange, as will be described. The tubes 604 are spaced apart to define spaces 606 therebetween. A crossflow (e.g., with reference to an orientation of the tubes 604) of ambient air, such as from vehicle movement, flows through the spaces 606, transverse to the tubes. Preferably, fins (not visible) are disposed in the spaces 606 to facilitate heat transfer. Preferably, the core 602 is made of aluminum.

The core 602 further comprises a core flange 610 disposed at a distal end of the core. The core flange 610 may be attached to the core 602 (e.g., such as by welding) or may be formed as part of the core. Preferably, the core flange 610 is formed from aluminum, and regardless, the core flange has a first coefficient of expansion (e.g., with respect to heat) in addition to previously described features of the core flange (incorporated by reference herein).

A recess 612 is defined between the core flange 610 and a locking ring 630. FIG. 6A is illustrated with a partial cutaway to reveal the recess 612.

The core flange 610 sealingly contacts a carbon fiber end tank 620. The carbon fiber end tank 620 defines a plenum (not visible) in fluid communication with the tubes 604 of the core 602. Additional features are contemplated, for example, a strut may be disposed in the plenum. In some embodiments, flow directors (or, alternatively, baffles) may be disposed in the plenum. The carbon fiber end tank 620 has a port 622, which acts as an inlet or outlet depending on flow direction, as previously described. The carbon fiber end tank 620 has a second coefficient of expansion (e.g., with respect to heat).

A locking ring 630 is provided to connect the carbon fiber end tank 620 to the core 602 (for example, by engaging the interposed core flange 610 connected to the core). The locking ring 630 may be aluminum or other suitable material. Edges 632 of the locking ring 630 overlap a portion of respective flanges (not visible) of the core flange 610 and the carbon fiber end tank 620.

A first end 634 of the locking ring 634 is connected to a second end 636 of the locking ring, the ends having aligned cross-bores. A pin 638 may be disposed in the aligned cross-bores, transverse to the locking ring (e.g., to connect respective ends of the locking ring). Once locked together, the locking ring 630 forms a continuous ring around the corresponding flanges of the core flange 610 and carbon fiber end tank 620, sealingly securing them together.

A linear wave spring 640 is disposed in the recess 612. The linear wave spring 640 locks the locking ring 630 to the core flange 610 to resist pressure (illustrated by a plurality of arrows A' in FIG. 6B), ensuring that the locking ring maintains an effective seal under a variety of operating temperatures and pressures, in spite of the materials having different coefficients of expansion. Alternatively, the recess could be on the carbon fiber end tank 620 and the locking ring 630.

This disclosure contemplates intercoolers with a carbon fiber end tank, core flange, and locking ring on one side and a different end tank arrangement on the other side. Examples of different end tank arrangements include an aluminum end tank welded to a core (with or without a core flange), or a molded plastic end tank affixed to the core by crimping the edges of the core flange around the edges of the plastic tank.

Similarly, instead of a carbon fiber end tank as described above, the locking ring could attach a molded plastic end tank having a flange to the core flange.

Locking rings described herein find use beyond connecting components of air to air intercoolers. For example, the principles described herein apply to other fluids, such as liquids, including cooling fluids, oils, etc. Moreover, although the flanges of the core flange and end tank are depicted as having generally rectangular perimeters, it can be appreciated that the locking ring is equally adaptable to connecting components having symmetrical perimeters (e.g., polygons, cylinders, etc.) and asymmetrical perimeters. As a result, it can be appreciated that the locking ring can be used to connect components of liquid to air intercoolers (e.g., either or both air and liquid sides), radiators, intake manifolds (such as a carbon fiber plenum to intake runners), oil coolers, transmission coolers, expansion tanks, fluid reservoirs (e.g., any automotive fluid). Moreover, the locking ring offers methods of fastening a fan shroud to a heat exchanger, or fastening multiple heat exchangers together, or an adapter for quick drop engine/transmission oil pan.

FIG. 7A depicts a system 700 having an automotive component 702 and a locking ring 720 (only a portion of which is depicted) according to another embodiment of the present disclosure. The automotive component 702 may be any of the preceding paragraph. The automotive component 702 comprises a plenum 704. The plenum 704 is for sealingly retaining a fluid (e.g., air or liquid). A flange 706 is disposed around a perimeter of the automotive component 702. The perimeter is depicted as rectangular, but it can be appreciated that the locking ring 720 is equally adaptable to connecting automotive components having symmetrical perimeters (e.g., polygons, cylinders, etc.) and asymmetrical perimeters. The locking ring 720 extends over the flange 706 and over a flange of a second component (not depicted) to connect them as previously described.

An interior portion 708 of the flange 706 is referred to as a face. The face 708 sealingly engages a face of the second component (not depicted), and are clamped together by the locking ring 720, as will be described. A channel 710 is formed in the face 708 and is coaxial to the perimeter. Other embodiments of the channel 710 are possible as long as the channel is continuous. A gasket (not depicted) may be retained in the channel 710. An exterior portion 712 of the flange 706 engages an edge of the locking ring 720.

FIG. 7B depicts a detail view of a first end 720*a* of the locking ring 720 of FIG. 7A. Edges 722 extend from the locking ring 720 to engage flanges (e.g., such as flange 706 (FIG. 7A)). The edges 722 are continuous along the length of the locking ring 720 in preferred embodiments, although cut-outs from the edges may be provided to navigate sharp turns in the perimeter. A recess 724 is disposed in the first end 720*a*. A cross-bore 726 extends across the first end 720*a*.

FIG. 7C depicts a detail view of a second end 720*b* of the locking ring 720 of FIG. 7A. Edges 722 extend from the locking ring 720 to engage flanges (e.g., such as flange 706 (FIG. 7A)). The edges 722 are continuous along the length of the locking ring 720 (e.g., from the first end 720*a* to the 720*b*) in preferred embodiments, although cut-outs from the edges may be provided to navigate sharp turns in the perimeter. In the second end 720*b*, a tab 724' is provided to be inserted in the recess 724 (FIG. 7B) disposed in the first end 720*a*. A cross-bore 726' extends across the tab 724', and is configured to align with the cross-bore 726 (FIG. 7B) when the tab 724' is fully inserted in the recess 724 (FIG. 7B). The locking ring 720 could be one piece of sufficient length to surround the flanges and connect (such as by inserting a pin in the cross-bores 726 and 726'). However, in a preferred embodiment, the locking ring 720 is a pair of identical portions such as locking ring 720 inversely connected (first end of one portion connected to a second end of a second portion).

FIG. 8A depicts a sectional view of a locking ring at a connection using the reference numerals from FIGS. 7B&7C. Edges 722 extend from the locking ring 720 (e.g., to engage corresponding flanges of automotive components). A tab 724' from the second end 720*b* (FIG. 7C) is inserted in the recess 724 (FIG. 7B) disposed in the first end 720*a*. Tab 724' is depicted with several rounded edges in FIGS. 7B, 7C, and 8A, but it is understood that a number of cross-sectional profiles are contemplated, including rectangular (with or without rounded edges), trapezoidal, oval, etc. A pin 802 is inserted through the aligned cross-bores. In some embodiments, the pin 802 is a slotted spring pin.

FIG. 8B depicts a sectional view of the locking ring (not at a connection). The edges 722 are continuous along the length of the locking ring 720 (e.g., from the first end 720*a* to the 720*b*) in preferred embodiments, although cut-outs from the edges may be provided to navigate sharp turns in the perimeter.

The invention claimed is:

1. A system comprising:
   a first automotive component having a first coefficient of expansion;
   a second automotive component having a second coefficient of expansion different from the first coefficient of expansion, wherein the first automotive component and the second automotive component each comprise a flange;
   a locking ring for attaching the first automotive component to the second automotive component; and
   a linear wave spring for biasing the locking ring against at least one of the flanges;
   wherein the first automotive component and the second automotive component cooperate to seal a plenum which remains sealed in a range of operating pressures from about 0 psi to 30 psi.

2. The system of claim 1, wherein the plenum remains sealed in a range of temperatures from about −20° F. to about 325° F.

3. The system of claim 1, wherein an inner channel of the locking ring engages an outer surface of each of the flanges.

4. The system of claim 1, wherein a first end and a second end of the locking ring are secured together by a transverse pin to form a continuous ring.

5. The system of claim 1, wherein the locking ring is a pair of identical portions inversely connected.

6. The system of claim 1, wherein the first and second automotive components are parts of an intercooler, a radiator, an intake manifold, an oil cooler, a transmission cooler, an expansion tank, a fluid reservoir, a fan shroud, a heat exchanger, an oil pan, or a transmission fluid pan.

7. An automotive intercooler comprising:
   an aluminum core;
   at least one carbon fiber end tank;
   a locking ring for attaching the carbon fiber end tank to the core; and
   a linear wave spring for biasing the locking ring against the core.

8. The intercooler of claim 7, further comprising a second carbon fiber end tank attached to an opposing end of the core by a second locking ring.

9. The intercooler of claim 8, wherein the first and second carbon fiber end tanks have the same coefficient of expansion but experience different temperatures.

10. The intercooler of claim 7, wherein the core comprises a core flange for engaging the at least one carbon fiber end tank.

11. The intercooler of claim 10, wherein an inner channel of the locking ring engages an outer surface of the core flange and an outer flange of the at least one carbon fiber end tank.

12. The intercooler of claim 7, wherein a first end and a second end of the locking ring are secured together by a transverse pin to form a continuous ring.

13. The intercooler of claim 12, wherein the locking ring is a pair of identical portions inversely connected.

14. The intercooler of claim 7, wherein the locking ring is a pair of identical portions inversely connected.

15. An automotive intercooler comprising:
   an aluminum core;
   a carbon fiber end tank;
   a locking ring for extending over respective flanges of the core and the carbon fiber end tank, thereby attaching the carbon fiber end tank to the core; and
   a linear wave spring for biasing the locking ring against one of the core and the carbon fiber end tank.

16. The intercooler of claim 15, wherein an inner channel of the locking ring engages outer surfaces of the respective flanges of the core and the carbon fiber end tank.

17. The intercooler of claim 15, wherein a first end and a second end of the locking ring are secured together by a transverse pin to form a continuous ring.

18. The intercooler of claim 15, wherein the locking ring comprises a pair of identical portions inversely connected.

19. The intercooler of claim 15, further comprising a second carbon fiber end tank attached to an opposing end of the core by a second locking ring.

20. The intercooler of claim 19, wherein the first and second carbon fiber end tanks have the same coefficient of expansion but experience different temperatures.

* * * * *